US006799934B1

(12) United States Patent
Bartlett

(10) Patent No.: US 6,799,934 B1
(45) Date of Patent: Oct. 5, 2004

(54) REAR LOADER VARIABLE PACKING DENSITY SYSTEM

(75) Inventor: William P. Bartlett, Dodge Center, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 10/389,195

(22) Filed: Mar. 14, 2003

(51) Int. Cl.[7] .................................................. B60P 1/00
(52) U.S. Cl. .................................... 414/525.2; 414/813
(58) Field of Search ........................... 414/525.2, 525.3, 414/525.4, 525.5, 525.51, 525.52, 525.53, 525.54, 525.55, 525.6, 813

(56) References Cited

U.S. PATENT DOCUMENTS 3,739,927 A 6/1973 Gollnick
4,104,853 A * 8/1978 Howard et al. ............... 56/341
4,427,231 A 1/1984 Smith
4,551,055 A 11/1985 Demenais
5,067,868 A 11/1991 Boda
5,823,728 A * 10/1998 Veldman et al. ............ 414/510

* cited by examiner

*Primary Examiner*—Joe Dillon, Jr.
(74) *Attorney, Agent, or Firm*—Nikolai & Mersereau, P.A.; C. G. Mersereau

(57) ABSTRACT

The disclosure describes a packing control system for a rear loading, rear discharge refuse packing body that enables adjustability in the overall weight distribution of the packed refuse. The packing density control system involves controlling the resistance of the packing/ejection panel against which refuse is packed in a rear loading refuse collection truck-body so that the force necessary to cause the panel to retreat toward the front of the truck as refuse is packed in front of it can be varied in accordance with the desired density profile of the load as it is packed.

15 Claims, 4 Drawing Sheets

REAR LOADER VARIABLE PACKING DENSITY SYSTEM

BACKGROUND OF THE INVENTION

I. Field of the Invention

The present invention is directed primarily to truck bodies designed specifically for refuse hauling trucks and, more particularly, to an improved packing and ejection mechanism control system for rear loading, rear discharging refuse truck bodies which enables the front-to-rear packing density of packed material to be varied within a load to thereby shift more of the refuse weight forward in the storage compartment of the refuse truck body to achieve improved load balance.

II. Related Art

Refuse collection trucks commonly include a truck chassis fitted with a distinctly configured body specifically designed for receiving, compacting, hauling and discharging refuse materials and including all of the associated operated mechanisms. One very successful design of refuse hauling truck bodies is known as a "rear loader" and includes a refuse hauling reservoir accessible for loading and discharging from the rear of the vehicle. This system includes a hydraulic compacting mechanism which repeatedly compacts the refuse after each loading. In this manner refuse eventually fills the available or useable reservoir volume extending from the front end back toward the rear of the body until no more material can be compacted. The forward wall against which the refuse is compacted in a typical rear loading refuse truck body also is the packing/ejection panel of a cylinder-operated ejection mechanism which, in effect, during an ejection cycle moves the panel aft on a horizontal plane in the manner, of a plow to expel the entire contents of the refuse volume during ejection. Typically, the bottom portion of the ejection mechanism is supported on a plurality of load bearing sliders carried by rails and adapted to slidably support the ejector system just above the truck body floor. The ejector system is operated by a hydraulic cylinder which typically mounts in the front of the truck body and is connected to the rear portion of the ejector panel, i.e., behind the face of the panel. By way of definition, this cylinder is referred to as the packing cylinder, ejection cylinder and packing/ejection cylinder. Likewise, the ejector panel may be referred to as the packing panel. These names arise from the fact that refuse is packed against the packing or ejector panel and the resistance of the packing or ejector panel to being pushed back is controlled by the packing/ejection cylinder.

The operation of the cylinder to position the ejector system is two-fold. When the cylinder is fully retracted the ejector is in the fully forward position as when the truck is fully loaded with refuse. When the cylinder is fully extended the ejector mechanism if moved fully aft to the truck body to a position where refuse will be completely expelled. At the beginning of the packing operation with the reservoir empty, the ejection mechanism and panel are positioned in the rearward portion of the truck body with the ejector mechanism exhibiting a preset resistance to retreating toward the forward end of the body. This is accomplished by controls which adjust the pressure in the ejection cylinder to a predetermined fixed amount. As this is exceeded, fluid is expelled from the cylinder and the piston rod retracts. This causes the ejection mechanism to retreat toward the front of the truck body as it is pushed ahead of the packed refuse against a constant resistance until the truck body is fully filled which, more or less, produces a load of substantially uniform packing density.

A rear loading, rear-discharging refuse body packing density control typically is one in which the hydraulic system is provided with a tailgate/ejector spool valve assembly which is typically located on the left or right front of the rear loader body and which has a dedicated open center sensing hydraulic cartridge in the ejector valve work section to control the ejector cylinder pressure. Other rear loader hydraulic systems use separate manifold assemblies to sense pressures within the packing cylinder. As previously indicated, all of these systems attempt to maintain a constant density in the refuse throughout the entire load.

A common problem with rear loading, rear discharging refuse packers of the class involves the weight distribution of the load. The packing process is designed to pack the load to a substantially uniform density from front to rear. However, rear loaders have a heavy tailgate assembly and large hopper for loading refuse that are located aft of the rear wheels of the chassis. The rear loader tailgate typically also contains large hydraulic spool valves, controls, slide and sweep assemblies and four large hydraulic cylinders to operate slide and sweep functions of the packing sequence. The rear loader tailgate may also carry optional devices such as cart tippers, tipper bars, winches and other accessories installed requiring yet more additional hydraulics and controls thereby adding still more weight aft. All of these components add to the weight of the rear loader tailgate and can cause the total tailgate weight to approach 10,000 lbs. (4,535 kg.) on some models. The added weight behind the chassis rear wheels makes it difficult for the front axle to reach or come close to its legally allowed gross front axle weight limit when the packer is loaded by the time the rear axles reach their gross weight rating. At that time, the rear loader has packed its maximum allowable payload even though the front axle may not be fully loaded or the body reservoir completely full. When the rear axles of the rear loader are at the maximum legal payload, the rear loader driver must leave the route and travel to the transfer station or landfill to unload.

Thus, there has existed a definite need to shift additional weight forward in the packer body storage reservoir so that more of the load is carried by the front axle so that the front axle will approach the gross weight limit when the rear axles are at the gross weight limit thus permitting trucks of the rear loader class to legally transport a greater total payload.

SUMMARY OF THE INVENTION

By means of the present invention there is provided a packing control system for a rear loading, rear discharge refuse packing body that enables adjustability in the overall weight distribution of the packed refuse. The packing density control system of the invention involves controlling the resistance of the packing/ejection panel against which refuse is packed in a rear loading refuse collection truck body so that the force necessary to cause the panel to retreat toward the front of the truck as refuse is packed in front of it can be varied in accordance with the desired density of the load as it is packed.

The variable packing density control system of the invention uses a detection system to sense the position of the packer/ejection panel within the vehicle and uses this information to control the pressure in the ejection cylinder which determines the resistance of the packing/ejection panel to the material being packed against it. Preferably, the system is controlled such that refuse material packed closest to the packing/ejection panel is subjected to higher packing force and thereby achieves a higher packing density. This translates to a higher packing density in the forward portion of the load when the packing/ejection panel retreats to its fully loaded position at the front of the refuse collection body.

In one preferred embodiment, the system utilizes one or more proximity or mechanical switches to sense angular position of the ejection cylinder which is normally attached between the forward portion of the refuse container body and the packing/ejection panel in a top-to-bottom relation which angle increases as the packing/ejection panel retreats toward the front of the refuse container body before the mass of packed refuse. When this angle reaches certain predetermined value, the packing density is switched usually from a higher to a lower amount in accordance with hydraulic control valve settings. It is also possible to use a system which modulates the pressure as the packing/ejection panel retreats to gradually change the packing density.

In this manner, the densest part of the load is shifted to the front of the refuse container body and therefore additional weight is transferred from the rear axles to the front axle thereby increasing the nominal capacity of the refuse vehicle by as much as about a ton.

BRIEF DESCRIPTION OF THE DRAWINGS

In the drawings wherein like reference characters refer to like parts throughout the same.

DETAILED DESCRIPTION

It will be understood that the invention may be embodied in different forms and that various uses may be made of the principles explained, pray the invention will be described with reference to an embodiment to illustrate these principles but that embodiment is meant as an example of the invention only and not as a limitation on the scope in any manner.

Figure 1:
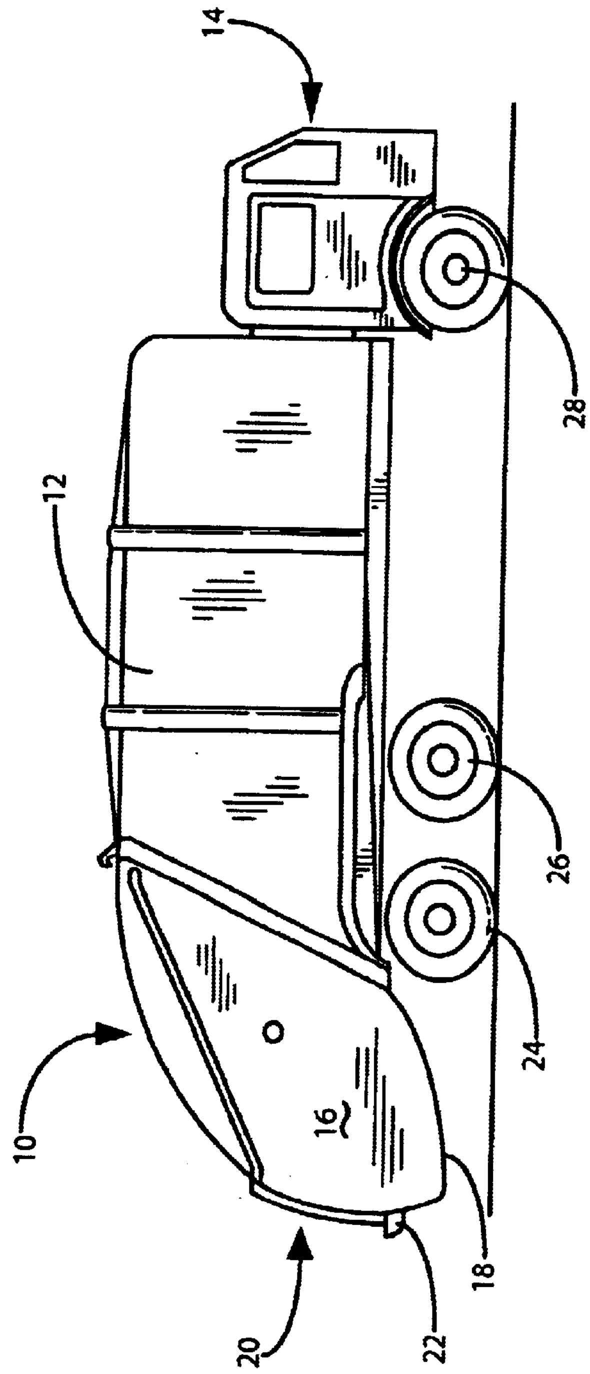
FIG. 1 is a side elevational view of a rear loading, rear discharging refuse vehicle of the class suitable for using the load density control system of the invention.

FIG. 1 of the drawings is a side elevational view of a rear loading/rear discharge refuse vehicle of the class suitable to be equipped with the variable packing density system of the present invention and includes a tailgate 10 attached to a storage body 12 and a cabin chassis portion 14. The tailgate 10 includes an open loading hopper 16 which has a curvilinear bottom wall 18 and a large receiving opening generally designated 20 for receiving refuse which may be from containers tipped over a sill, or the like, as at 22. The cab and chassis unit further includes a pair of dual wheel rear axles 24 and 26 and a front axle is shown at 28. As seen in the figure, the entire weight of the tailgate 10 is carried behind the rear axles 24 and 26. The tailgate unit carries the well known hydraulic sweeping and packing equipment (not shown) and possibly cart tipping or other such devices attach thereto at the sill 22 as are commonplace (also not shown).

As can be seen from the figure, even when the truck is fully loaded, the great majority of the weight is carried by the rear axles which may well reach their legal axle weight capacity prior to the front axle loading being near capacity, as was previously indicated.

Figure 3:
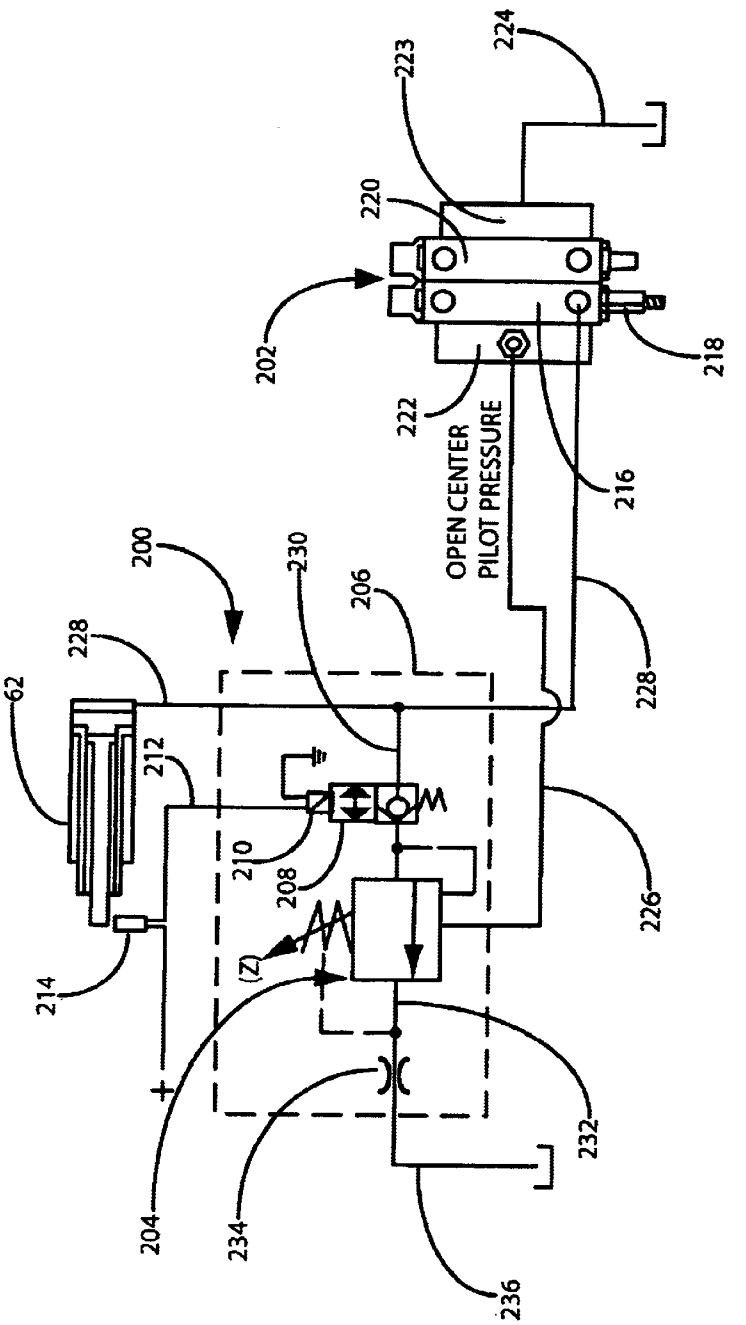
FIG. 3 is a schematic diagram of a hydraulic load density control system in accordance with another embodiment of the invention.
Figure 4:
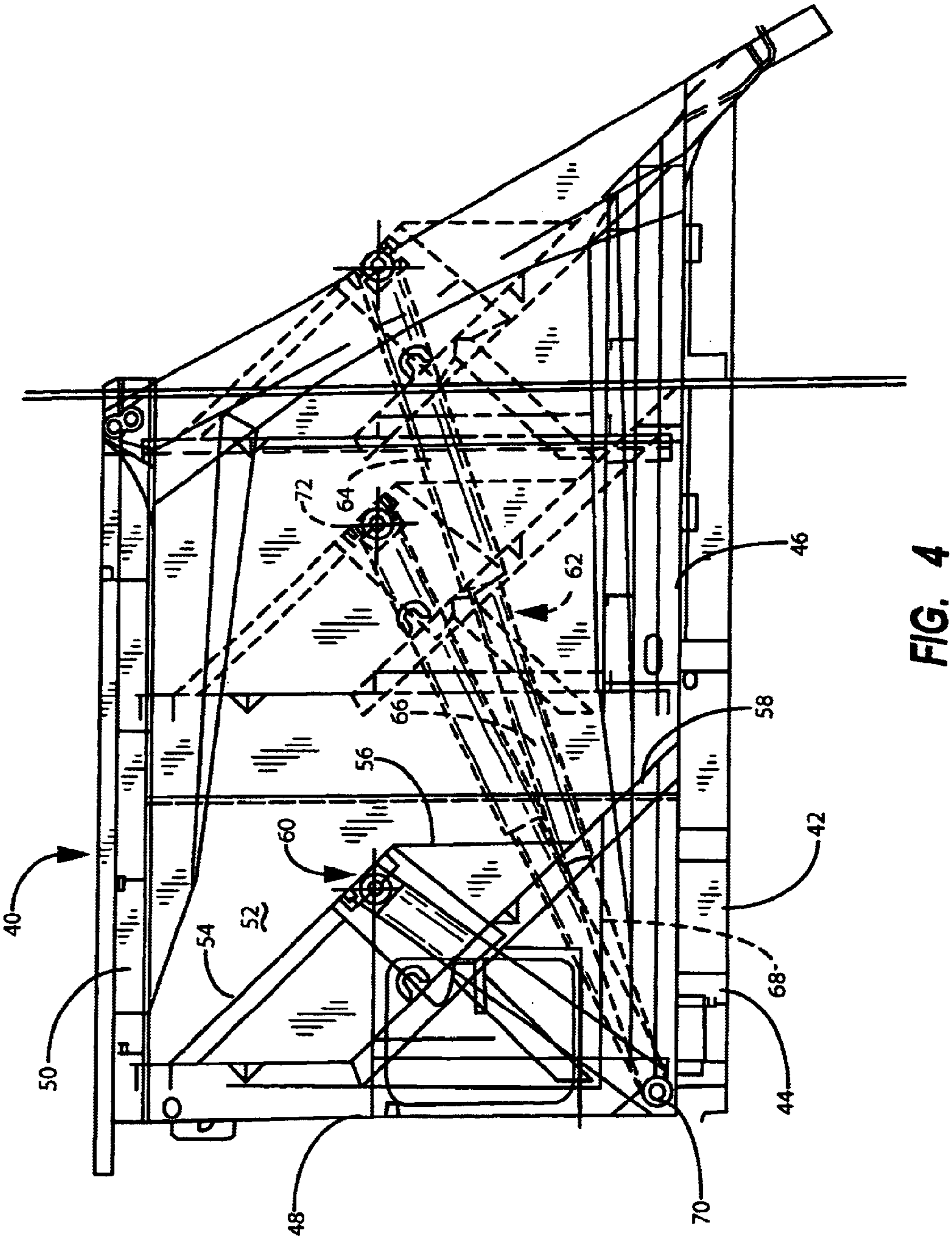
FIG. 4 is a side elevational view of a refuse reservoir of a rear loading, refuse collection body with the sidewall removed showing the ejector panel in a plurality of positions.

FIG. 4 depicts a truck body with the tailgate removed and the side cut away so that the packing/ejector blade operating system can more readily be viewed. It includes a hollow truck body generally at 40 including longitudinal and transverse structural support members 42 and 44 which support a metal floor plate 46. The body further includes top structural members as at 50 and a far side wall 52, also of metal plate. The packing/ejection panel extends essentially from near the top to near the bottom of the interior of the truck body storage reservoir and also extends substantially from side to side. It includes a top angled segment 54, a substantially vertical segment 56 and a second angled segment 58 which together form the panel structure. The packing/ejection panel which may generally be referred to as 60 is operated by a telescoping fluid-operated (normally hydraulic) cylinder, generally at 62, having telescoping segments 64, 66 and 68. The cylinder is preferably mounted at an angle with the rod end pivotally mounted in the lower front portion of the collector body reservoir as at 70 and the blind or cylinder end pivotally mounted to the upper portion of the structure 60 in segment 54 as at 72. Of course, the rod end and the cylinder end of the cylinder 62 may be reversed, however, the mounting is depicted in FIG. 3 as preferred inasmuch as the fluid connection to the cylinder 62 is preferably through the rod end in segment 68.

The system is shown in three locations, namely, in the far forward or fully packed location, in a midway location and at the full eject location with the cylinder 62 fully extended. The latter position fully expels the contents of the refuse container reservoir and is the position utilized at the beginning of the packing cycle where refuse is again packed into the hollow container reservoir. Thus, as refuse is packed against the packing/ejection panel 60, as the packing force exceeds the force exerted by the cylinder 62, the cylinder begins to retract and the system moves toward the front end of the container reservoir.

Figure 2:
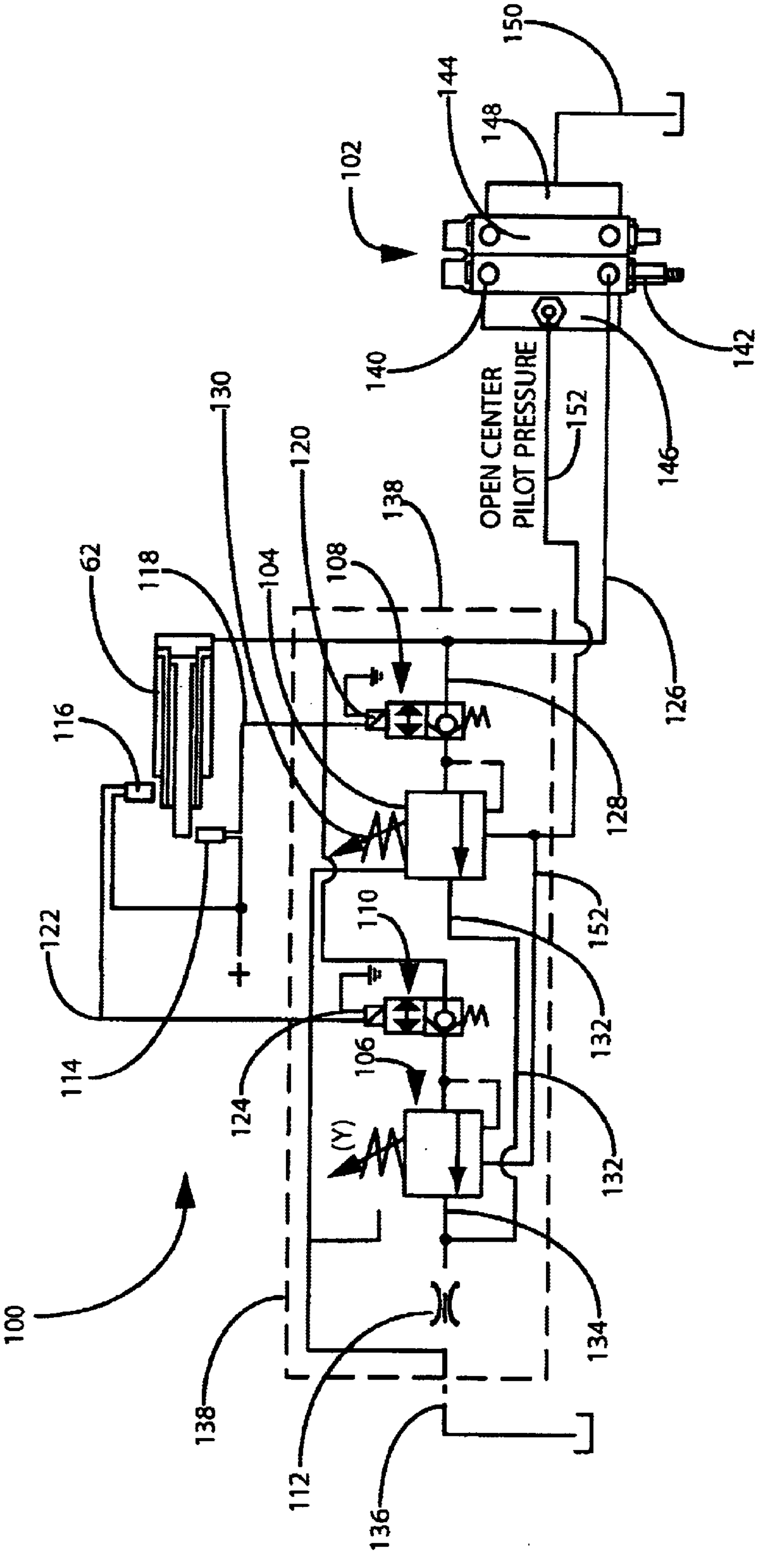
FIG. 2 is a schematic diagram of a hydraulic load density control system in accordance with one embodiment of the invention.

FIG. 2 depicts a schematic diagram of one variable packing density hydraulic system for a rear loading refuse truck configured in accordance with one embodiment of the invention. The system illustrated in FIG. 2, as shown generally at 100, is designed to pack refuse in three different controlled segments which may be at three different densities based on three different packing pressure operating control settings which can be adjusted as desired. This system includes a tailgate/ejector spool valve assembly 102 and a manifold assembly generally within the broken line 138 and which includes a pair of pressure-biased valves in the form of variable density or adjustable auxiliary packing cartridges including a first variable density adjustable auxiliary packing cartridge 104 and a second variable density or adjustable auxiliary packing cartridge 106. Each auxiliary packing cartridge is associated with a respective control valve which, when open, connects the adjustable auxiliary packing cartridge with the barrel end of the cylinder 62. These access valves are preferably two-way, two-position (2W2P) normally closed (NC) cartridge valves as at 108 and 110. Likewise, however, other known valve systems such as three-way, three position (3W3P) valves, etc., could also be used in this application. A return line metering outlet orifice is shown at 112.

Rearward and forward position sensing devices 114 and 116 are provided which may be proximity detecting devices, mechanical switches or any other such devices that are capable of sensing the extension position of the cylinder 62 as will be explained. The sensing devices 114, 116 also act as signaling devices to open respective (2W2P) NC cartridges 108 and 110. Thus, proximity-detecting the device 114 is connected to cartridge valve 108 via electrical signal line 118 to valve operating coil 120 and proximity detecting device 116 is likewise connected to cartridge valve 110 via electric signal control line 122 to valve operating coil 124. The normally closed cartridge valve 108 together with the first adjustable auxiliary packing cartridge 104 are used to control a second packing pressure in the rear loader and the second adjustable auxiliary packing cartridge 106 operating in conjunction with the control cartridge valve 110 controls the packing at a third predetermined packing pressure utilizing signals from the respective position detecting devices 114 and 116 in conjunction with packing system pressure as will be discussed.

The first and second auxiliary packing cartridge assemblies 104 and 106 are designed to operate exclusive of each other and can be set to open at any pressure below that of the ejector spool valve (below). A hydraulic fluid supply/drain line 126 is connected between spool valve assembly 102 and the barrel end of cylinder 62. The line 126 further connects to cartridge 108 via line 128 and cartridge 110 via line 130. Lines 128 and 130 are used for drainage from the barrel end of cylinder 62. Separate outlet or drain lines are provided at 132 and 134 with regard to the auxiliary packing cartridges 104 and 106, respectively, which join into a common line 136 above the metering orifice 112. The broken line 138 depicts the manifold assembly containing the auxiliary control assembly.

The tailgate/ejector spool valve assembly 102 includes an ejector work valve 140, including a packing cartridge 142, a tailgate work valve 144, an inlet which may have an unloader spool 146, which also includes a main relief valve, and the inlet for the oil line for the pump connected to an associated flow controller (not shown). An outlet is shown at 148 with return or drain line 150. The packing devices and equipment themselves may be conventional and are generally known and need no further explanation here. An open center pilot pressure line is connected to both auxiliary packing cartridges 104 and 106 as shown as 152.

The general packing operation also is quite well known and is accomplished by sweeping refuse from the charging hopper using a pair of sweep cylinders and using a pair of slide cylinders to move a slide and pack the refuse against the ejector panel which retreats incrementally as the associated packing cartridge valve opens and closes based on system pressure. The hydraulic pressure required to open the associated packing cartridge valve is preset at a pressure somewhat below the maximum operating or kick out pressure of the slide cylinder, the amount being dependent on the desired packed refuse density. The initial packing pressure will be determined by the setting of the ejector work valve packing cartridge 142.

If the slide cylinder kick out pressure is 2450 psi, for example, the valve packing cartridge 140/142 may be set at 2250 psi. The pressure in the packing or slide cylinders also appears in the open center pilot pressure line 152. The auxiliary sequential packing cartridges 104 and 106 are normally set to open at different, lesser values x and y to modulate packing density toward the rear of the load as desired, or at the same value. As previously stated, the control system provides for independent operation of the auxiliary packing cartridges 104 and 106, however, they are both subject to the maximum setting in the spool valve packing/ejection cartridge 138 which remains in a control mode.

In operation, at the beginning of the packing cycle the container reservoir body 40 is empty and the ejector panel is in the far rearward position (cylinder 62 fully extended). Refuse is loaded into the receiving hopper, it is packed into the rear loader body against the packing panel 60 using the slide cylinders thereby applying forces against the packing panel 60. The pressure in the slide cylinders increases as the slide moves up to pack refuse in the truck body as does the resisting pressure in the packing/ejection cylinder 62. At this time, the maximum pressure in the packing/ejection cylinder 62 is set to the maximum desired pressure so that the material packed against the packing panel 60 will be at maximum density.

When the necessary maximum packing force is achieved based on open center pressure of the ejector work valve 140 or the pressure in the slide cylinders, the packing cartridge valve is opened for a fraction of a second allowing a small amount of hydraulic fluid to be released from the barrel end of the packing/ejection cylinder 62 which will allow the cylinder to incrementally retract and allow the next refuse to be packed. The controlled level of the hydraulic pressure in the packing/ejection cylinder in the time of each incremental release, of course, will determine the density of the refuse packed at that point.

In accordance with one aspect of the invention, as indicated, the ejector work valve 140 is designed to control the density of the initial portion of the packed refuse at a very high density in accordance with the need for shifting cargo weight toward the front of the vehicle. As the packing/ejection cylinder 62 retracts, the sensor 114 will be able to identify the angle of the packing/ejection cylinder or otherwise determine the packing/ejection panel position and electrically signal the operator coil 120 which energizes opening 2W2P NC cartridge 108. This is at the point where it is indicated that the high or first density portion of the load should end. This switches the normally closed cartridge 108 to the open position which switches control of fluid release switches to packing cartridge 104. This allows hydraulic fluid to meter from the barrel end of the packing/ejection cylinder through and based on the operation of the variable density packing cartridge 104 and the orifice 112 based on the pressure as determined by the setting (x) of variable density cartridge 104 as it is equaled by the pressure in open center pilot pressure line 152. This changes (normally lowers) the density of the refuse packed in accordance with the setting (x).

Likewise, as the packing/ejection cylinder 62 continues to retreat, it will move beyond sensor 114 and control will be switched to the second sensor 116 which will cause cartridge 110 to open and allow the system to change or maintain the density of the load in a like manner based on the setting (y) of the auxiliary packing cartridge 106. Thus, the electrical signal from the sensor 116 will travel on line 122 to operator coil which will be energized to open the normally closed 2W2P cartridge 110 and allow the auxiliary packing cartridge 106 to control the draining of fluid utilizing the open center pilot pressure in line 152. The setting (y) may be different, usually lower, than the setting (x) or may be the same depending on the desired loading density profile.

Generally, in accordance with an aspect of the present invention, it is desirable to have the highest packing density near the front of the loaded vehicle and the lowest packing density at the rear to compensate for the heavy tailgate. Thus, generally the initial setting of ejector work valve $>x>y$.

The sensors 114, 116, of course, can be adjusted to sense the varying angles of the packing/ejection cylinder and base control on the deserved legal weight distribution of the packer/chassis combination. As indicated, the sensors 114, 116 may be any type of suitable proximity detection device or any kind of a tripable mechanical limit switch or the like in addition to being one which senses the angle of the cylinder rod or senses the linear position of the packing/ejection panel as the packing/ejection panel retreats toward the front of the rear-loading vehicle.

The system has been illustrated in FIG. 2 as a 3-position, 3-density (high/lower/low) system; however, a simpler 2-density (high/low) system can be provided, for example, that will allow any desired high/low density profile to be implemented along the load. Such a system is illustrated in FIG. 3 which depicts a schematic hydraulic system diagram of another embodiment of a variable packing density system which is otherwise similar to that of FIG. 2, but which is designed to pack refuse at two different densities based on two different packing pressure controls. This system, generally at 200, also includes a tailgate/ejector spool valve assembly 202 and a single auxiliary packing cartridge 204, shown within a manifold assembly designated by broken line 206. Variable density auxiliary packing cartridge 204 with adjustable operating pressure (z) is associated with (2W2P) normally closed (NC) cartridge 208 with operating coil 210 which is connected by a signal line 212 to a single position sensing device 214.

The tailgate/ejector spool valve assembly 202 includes an ejector work valve 216 with packing cartridge 218, a tailgate work valve 220, an inlet which may have an unloader spool 222 which also includes the main relief valve and the inlet for the oil line for the pump connected to an associated flow control (not shown) and an outlet 223 with return or drain line 224. This assembly may be the same as that shown and discussed in conjunction with FIG. 2.

An open center pilot pressure line 226 is connected to a variable density auxiliary packing cartridge 204. A hydraulic fluid supply/drain line connecting to the barrel end of cylinder 62 is shown at 228. A line 230 connects line 228 with the normally closed cartridge 208 which also is provided with an outlet drain 232, orifice 234 and drain 236. The operation of this system is similar to the operation of the system described in conjunction with FIG. 2 except that only a single sensor is used and packing density continues to be controlled by the variable density auxiliary packing cartridge 204 for the rest of the load.

Both systems are quite useful; a certain packer, for example, may require the front half of the load to be very dense and the last half to be less dense. Another packer and chassis combination may require the first third of the load to be very dense and the middle third lighter and the last third of the load to be lighter still. The correct combination should be determined by initially weighing the packer and chassis to achieve the best legal axle weights. In this manner, more weight can be safely shifted forward in the loaded packer while maintaining operation of the vehicle well within the GVW weight limits or axle capacity weight limits as determined by local, state and Federal laws.

It should be noted that the telescoping packing/ejection cylinder is shown mounted with the rod end of the cylinder in the lower forward position of the packer body reservoir and the barrel end elevated against the packer panel upper section 54. As with other exemplary illustrations, other mounting positions such as mounting the rod end at the top of the forward portion of the truck body container refuse reservoir with the barrel end against the lower panel portion 58 are contemplated.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A packing density control system for a rear loading refuse collecting truck body comprising:

(a) a hollow refuse collection truck body; and (b) a packing/ejection panel operable in said refuse collecting truck body by moving fore and aft, respectively during packing and ejection, in said truck body and having a resistance to movement along and in said truck body as it retreats toward the front thereof during packing; and (c) a hydraulic packing/ejection cylinder in said truck body for operating said packing/ejection panel connected between said packing/ejection panel and the front of said truck body; and (d) a control system for controlling said resistance to movement of said packing/ejection panel at a plurality of levels in a manner such that refuse materials packed in different areas of the truck body are enabled different packing densities.

2. A packing density control system as in claim 1 wherein refuse material packed closest to said ejector panel is subjected to higher packing force and thereby achieves a higher packing density.

3. A packing density control system as in claim 1 wherein said control system controls incremental release of hydraulic fluid from the packing/ejection cylinder at a plurality of pressures.

4. A packing density control system as in claim 1 wherein said control system further comprises:

(a) a plurality of control devices to control packing density;

(b) one or more sensor devices to detect the position of said packing/ejection panel in said refuse collection truck body;

(c) one or more devices to sequentially switch control from one of said plurality of controlled devices to another.

5. A packing density control system as in claim 2 wherein said control system further comprises:

(a) a plurality of control devices to control packing density;

(b) one or more sensor devices to detect the position of said packing/ejection panel in said refuse collection truck body;

(c) one or more devices to sequentially switch control from one of said plurality of controlled devices to another.

6. A packing density control system as in claim 3 wherein said control system further comprises:

(a) a plurality of control devices to control packing density;

(b) one or more sensor devices to detect the position of said packing/ejection panel in said refuse collection truck body;

(c) one or more devices to sequentially switch control from one of said plurality of controlled devices to another.

7. A packing density control system as in claim 4 wherein said one or more said sensor devices are proximity sensors which detect a changing angle subtended by said hydraulic packing/ejection cylinder as related to the position of said packing/ejection panel.

8. A packing density control system as in claim 4 wherein each of said-control devices to control packing density include a packing cartridge valve which opens to allow incremental drainage of hydraulic fluid from said hydraulic packing/ejection cylinder, when the pressure in said packing/ejection cylinder reaches a preset amount.

9. A packing density control system as in claim 7 wherein each of said control devices to control packing density include a packing cartridge valve which opens to allow incremental drainage of hydraulic fluid from said hydraulic packing/ejection cylinder, when the pressure in said packing/ejection cylinder reaches a preset amount.

10. A packing density control system as in claim 4 wherein each of said one or more devices for sequentially switching control from one to the next control devices includes a cartridge valve selected from the group consisting of two-way, two-position normally closed cartridge valves and three-way, three position normally closed cartridge valves.

11. A packing density control system as in claim 5 wherein each of said one or more devices for sequentially switching control from one to the next control devices includes a cartridge valve selected from the group consisting of two-way, two-position normally closed cartridge valves and three-way, three-position normally closed cartridge valves.

12. A packing density control system as in claim 10 wherein each of said one or more devices for sequentially switching control from one to the next control devices includes a two-way two-position normally closed cartridge valve.

13. A packing density control system as in claim 11 wherein each of said one or more devices for sequentially switching control from one to the next control devices includes a two-way, two-position normally closed cartridge valve.

14. A packing density control system as in claim 4 including two control devices.

15. A packing density control system as in claim 4 including three control devices.

* * * * *